United States Patent
Pozhenko et al.

(10) Patent No.: US 8,036,125 B2
(45) Date of Patent: Oct. 11, 2011

(54) APPARATUS AND METHOD FOR TRANSMITTING MULTIMEDIA STREAM USING VIRTUAL MACHINES BASED ON A NUMBER OF TRANSMISSIONS AT A DATA RATE

(75) Inventors: Mikhail Pozhenko, Suwon-si (KR); Sang-bum Suh, Seoul (KR); Sung-kwan Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 11/871,493

(22) Filed: Oct. 12, 2007

(65) Prior Publication Data
US 2008/0219253 A1    Sep. 11, 2008

(30) Foreign Application Priority Data
Mar. 9, 2007   (KR) .................. 10-2007-0023571

(51) Int. Cl.
*H04L 12/26*   (2006.01)
(52) U.S. Cl. ..................... 370/235; 370/252
(58) Field of Classification Search .............. 370/235, 370/252; 709/207, 230–237, 228
See application file for complete search history.

(56) References Cited

U.S. PATENT DOCUMENTS

| | | | | |
|---|---|---|---|---|
| 6,005,851 A * | 12/1999 | Craddock et al. | ............. | 370/329 |
| 7,502,818 B2 * | 3/2009 | Kohno et al. | ................. | 709/203 |
| 7,742,497 B2 * | 6/2010 | Ganti et al. | ................... | 370/448 |
| 2002/0075857 A1 * | 6/2002 | LeBlanc | ........................ | 370/352 |
| 2003/0097393 A1 * | 5/2003 | Kawamoto et al. | ............... | 709/1 |
| 2003/0120794 A1 * | 6/2003 | Futenma et al. | .............. | 709/231 |
| 2004/0259589 A1 | 12/2004 | Bahl et al. | | |
| 2005/0188088 A1 * | 8/2005 | Fellenstein et al. | ........... | 709/226 |
| 2006/0126581 A1 * | 6/2006 | Katsumata et al. | ........... | 370/338 |
| 2006/0193327 A1 * | 8/2006 | Arndt et al. | ............. | 370/395.21 |
| 2006/0265483 A1 * | 11/2006 | Wang et al. | ................... | 709/223 |
| 2007/0160079 A1 * | 7/2007 | Han et al. | ....................... | 370/465 |
| 2008/0043756 A1 * | 2/2008 | Droux et al. | .................. | 370/399 |
| 2008/0151751 A1 * | 6/2008 | Ponnuswamy et al. | ....... | 370/232 |

FOREIGN PATENT DOCUMENTS

| | | | |
|---|---|---|---|
| JP | 2003-259447 A | | 9/2003 |
| KR | 10-2004-0009928 A | | 1/2004 |
| KR | 10-2006-0074786 A | | 7/2006 |

* cited by examiner

*Primary Examiner* — Huy Vu
*Assistant Examiner* — Benjamin Lamont
(74) *Attorney, Agent, or Firm* — Sughrue Mion, PLLC

(57) ABSTRACT

An apparatus and method are provided for variably transmitting a multimedia stream according to requirements of a client device and the state of a channel. The multimedia stream transmission apparatus includes: a plurality of virtual machines corresponding to the multiple client applications, each of the virtual machines determining a specific parameter set and obtaining a change value for the parameter set from network statistics and a requirement of a corresponding client application; a parameter adjustment unit which adjusts values of parameters used in a network interface by the change value; and the network interface which transmits the multimedia stream based on the adjusted parameters.

16 Claims, 10 Drawing Sheets

APPARATUS AND METHOD FOR TRANSMITTING MULTIMEDIA STREAM USING VIRTUAL MACHINES BASED ON A NUMBER OF TRANSMISSIONS AT A DATA RATE

CROSS-REFERENCE TO RELATED APPLICATION

This application claims priority from Korean Patent Application No. 10-2007-0023571, filed on Mar. 9, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to multimedia streaming, and more particularly, to variably transmitting a multimedia stream according to requirements of a client device and the state of a channel.

2. Description of the Related Art

Related art demand for technology to provide a stream of multimedia contents in real time through a network has been increasing. When this technology is applied to a wireless network, there are difficulties due to the characteristics of the wireless network environments. To achieve high-quality video streaming, one may consider the issues of wireless bandwidth fluctuation, multipath fading, contending traffic, etc. Therefore, transmitting multimedia on a wireless network requires robustness against a partial data loss due to packetization of a video frame and against a high packet error rate. In addition, it may also be necessary to support mutually different types of client devices in consideration of their respective characteristics in order to achieve high-quality video streaming. Furthermore, as the user demand for client devices supporting a high resolution increases, the need for stable multimedia transmission guaranteeing the video quality becomes greater and greater.

FIG. 1 is a block diagram illustrating the configuration of a related art transceiver supporting adaptive channel control (U.S. Pat. No. 6,005,851). A transceiver receives a data packet from a data source/sink. The transceiver includes a dispatcher 20, which outputs data to channel controllers 24a to 24e through data lines 22a to 22e. The dispatcher 20 is connected for two-way communication with the channel controllers 24a to 24e through control lines 26a to 26e. The dispatcher 20 is connected for two-way communication with a sync controller 30 through a control line 28. The channel controllers 24a to 24e are coupled for two-way communication with a packet send and receive unit (PSRU) 34. Each of the channel controllers 24a to 24e also has a data output line connected to a multiplexer (MUX) 35. The MUX 35 output, in turn, outputs data to the data source/sink.

In FIG. 1, virtual channels for each data type (e.g., video, graphics, text) are created and mapped onto the physical channels based on a priority assigned to each virtual channel. Also, each virtual channel is allocated a quality of service (QoS), and each channel controller 24a to 24e is allocated to each virtual channel. These channel controllers 24a to 24e are connected to the dispatcher 20, which receives a stream of data packets and distributes the data packets to the channel controllers 24a to 24e based on the virtual channels which are allocated to the channel controllers 24a to 24e.

When any one of the channel controllers 24a to 24e encounters degradation in a transmission which reduces QoS below a specified value, a QoS parameter is adjusted. If this action does not achieve the specified QoS, the corresponding channel controller warns the dispatcher 20. Upon receipt of the warning, the dispatcher 20 reduces the corresponding channel controller's specified QoS or another channel's QoS, depending on the data type. When the dispatcher 20 takes no action, the corresponding channel controller degrades the data to achieve the required QoS.

As described above, the related art has disclosed methods for adjusting several QoS parameters according to the channel state. However, the disclosed related art methods include only independent adjustment of the QoS parameters according to the channel state, and do not provide yet a technique of optimizing a network bandwidth by synthetically considering the requirements of various client applications.

SUMMARY OF THE INVENTION

The present invention provides an apparatus and method for variably transmitting a multimedia stream according to requirements of a client device and the state of a channel. The apparatus and method can improve the quality of streaming video through a virtual interface in a multimedia stream transmission apparatus. Further, the apparatus and method can reduce the consumption of system resources in a multimedia stream transmission apparatus.

According to an aspect of the present invention, there is provided a multimedia stream transmission apparatus including: virtual machines determining a specific parameter set and obtaining a change value for the parameter set from network statistics and requirements of client applications; a parameter adjustment unit adjusting values of parameters used in a network interface by means of the change value; and the network interface transmitting the multimedia stream based on the adjusted parameters.

According to another aspect of the present invention, there is provided a multimedia stream transmission method including: determining a specific parameter set and obtaining a change value for the parameter set, from network statistics and requirements of the client devices; adjusting values of parameters used in a network interface by means of the change value; and transmitting the multimedia stream based on the adjusted parameters.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE EXEMPLARY EMBODIMENTS

Aspects and features of the present invention, and methods for achieving them will be apparent to those skilled in the art from the detailed description of the exemplary embodiments together with the accompanying drawings. The scope of the present invention is not limited to the exemplary embodiments disclosed in the specification and the present invention can be realized in various types. The exemplary embodiments are presented only for completeness and to enable those skilled in the art to completely understand the scope of the present invention, and the present invention is defined only by the scope of the claims. Like numbers refer to like elements throughout. Hereinafter, an exemplary embodiment will be described with reference to the accompanying drawings.

A method of synthetically adjusting various types of inter-layer network parameters through mutually different virtual machines is provided. The term "virtual machine" represents each machine obtained by individualizing physical machines by software that drives a guest operating system or provides an operating environment for hosting.

According to the exemplary method, various parameter sets can be adjusted in mutually different virtual machines by using the virtualization technology. Also, it is possible to analyze collected transmission statistics and to adapt each video stream to a change in a channel. That is, to the exemplary embodiment can cause a network driver for wireless transmission, which receives various QoS requirements, to include a plurality of virtual machines.

Figure 1:
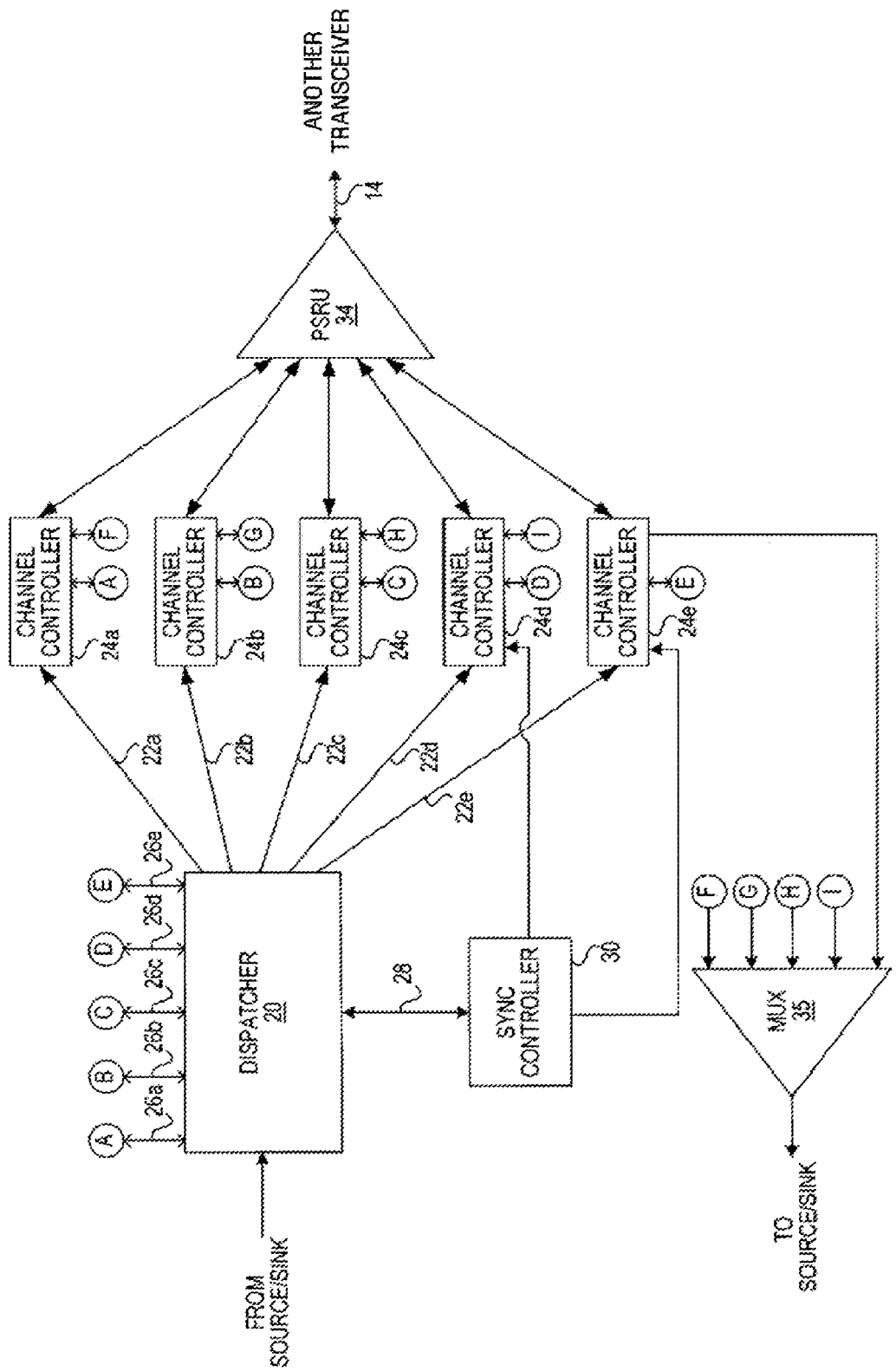
FIG. 1 is a block diagram illustrating the configuration of a related art transceiver supporting adaptive channel control.
Figure 2:
FIG. 2 is a view illustrating an exemplary environment to which the exemplary embodiments of the present invention can be applied.

FIG. 2 is a view illustrating an environment to which the exemplary embodiments can be applied. The exemplary embodiments will be described with reference to a point-to-point connection in an 802.11 series standard system. A multimedia stream transmission apparatus 200 provides a streaming service of multimedia contents to one or more client devices 41 and 42. Although the multimedia contents may include video, audio, a still image, a text, and various multimedia data, the following description will be generally focused on transmission of high-quality video. For example, high-quality video may be transmitted in a real time mode from the multimedia stream transmission apparatus 200 to the client devices, such as a digital TV (DTV) 41 and/or a portable multimedia player (PMP) 42. The multimedia stream transmission apparatus 200 and the client devices 41 and 42 include the same wireless network card (e.g., network interface), in which one frequency bandwidth and a plurality of parameter sets are set.

The multimedia stream transmission apparatus 200 dynamically performs link adaptation based on various QoS requirements of the client devices 41 and 42. In this case, since various parameters may affect the link adaptation, the exemplary embodiment employs a method of selecting sets of parameters which exert a great influence in all available channel environments, storing the parameter sets as a database, and increasing or decreasing parameter values in a corresponding parameter set when a channel environment occurs.

Adjustment of parameters contained in only one layer, such as a Media Access Control (MAC) layer or a Physical (PHY) layer, is insufficient in reflecting various QoS requirements of the client devices 41 and 42. Therefore, parameters which can be included in parameter sets are provided from various layers.

Figure 3:
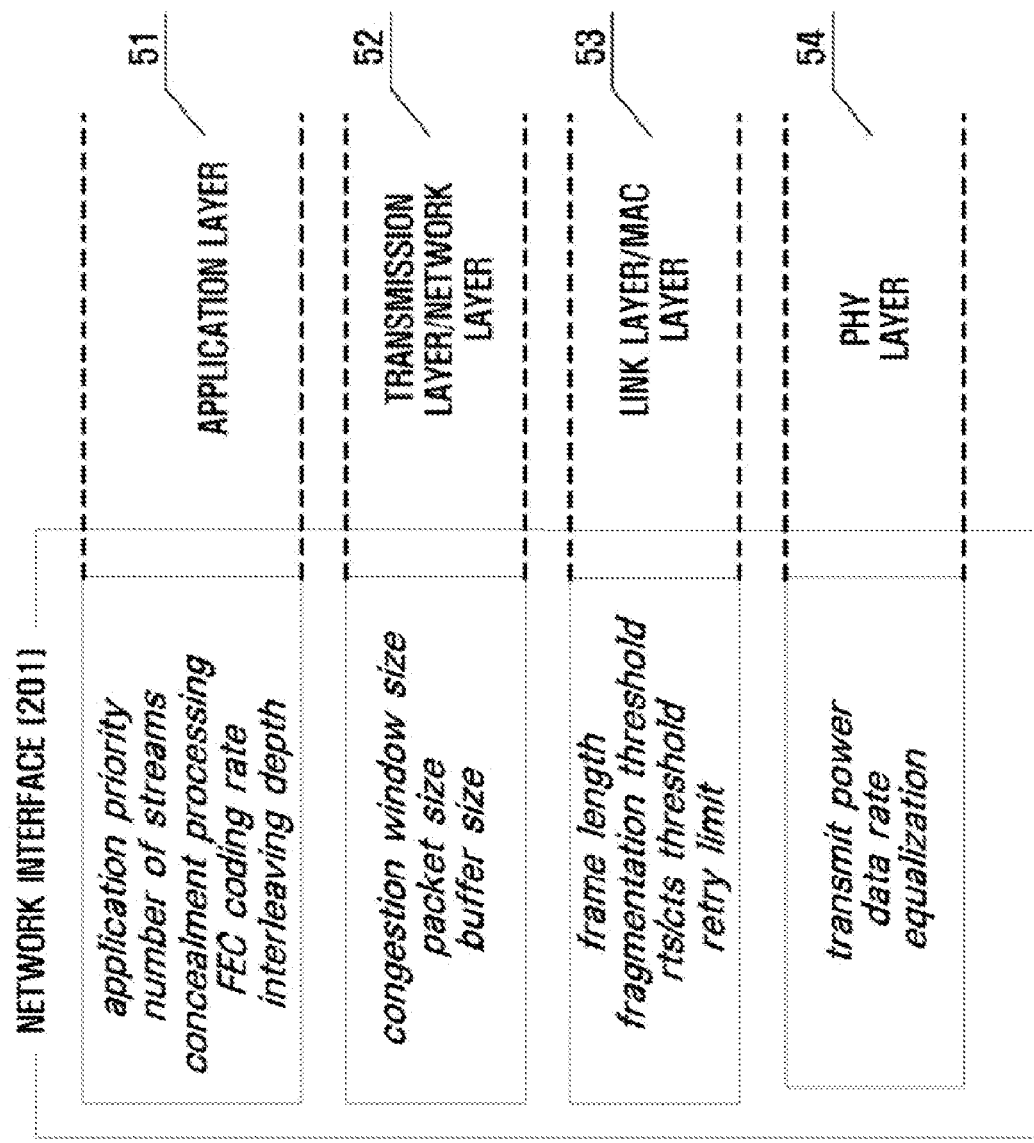
FIG. 3 is a view illustrating an example of various parameters which exist in a plurality of layers according to an exemplary embodiment.

FIG. 3 is a view illustrating such a concept. Various layers 51 to 54 managed by a network interface 201 include parameters which exert an influence upon transmission of multimedia.

An application layer 51, which is the highest layer, includes parameters containing an application priority, a number of streams, concealment processing, a forward error correction (FEC) code rate, and an interleaving depth.

A transmission layer/network layer 52 lower than the application layer 51 includes parameters containing a congestion window size, a packet size, and a buffer size.

A Link layer/MAC layer 53 includes parameters containing a frame length, a fragmentation threshold, an RTS/CTS threshold (Request to Send/Clear to Send), and a retry limit.

Finally, a PHY layer 54, which is the lowest layer, includes parameters containing a transmit power, a data rate, and equalization.

As described above, even parameters existing in mutually different layers may have a relation therebetween. Therefore, it is necessary to optimize the use of a bandwidth by adjusting inter-layer parameters.

Figure 4:
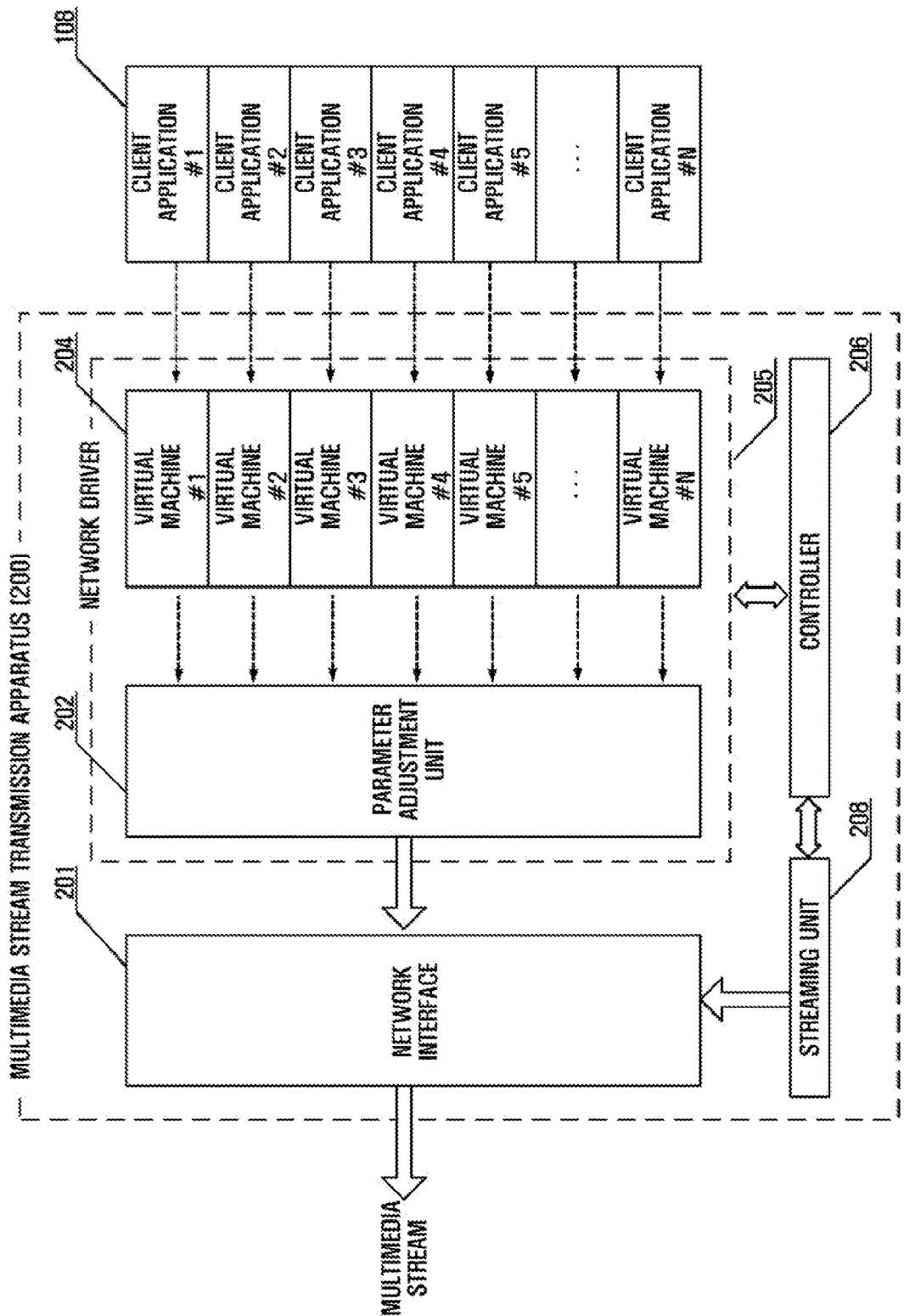
FIG. 4 is a block diagram illustrating the configuration of a multimedia stream transmission apparatus according to an exemplary embodiment of the present invention.

FIG. 4 is a block diagram illustrating the configuration of the multimedia stream transmission apparatus 200 according to an exemplary embodiment of the present invention. The multimedia stream transmission apparatus 200 may include a network interface 201, a network driver 205, a controller 206, and a streaming unit 208.

The controller 206 is connected to other components of the multimedia stream transmission apparatus 200 through a communication bus, and controls the operations of the other components. The controller 206 may be characterized as a central processing unit (CPU), a microprocessor, a microcomputer, etc.

The streaming unit 208 encodes multimedia data by a codec, and streams the encoded multimedia data to client devices (i.e., client applications) by a realtime transmission protocol, such as a Real-time Transport Protocol (RTP), a Real-time Transport Streaming Protocol (RTSP), etc.

The network driver 205 receives QoS requirements for multimedia streaming from a plurality of client applications 108, determines a set of parameters to be adjusted based on the QoS requirements and network statistics, and increases or decreases the values of the parameters in the determined parameter set. The parameter set may include parameters which have a close relation with QoS requirements currently requested by client applications, and have a great influence upon the video quality requested.

To this end, the network driver 205 includes a plurality of virtual machines 204 and a parameter adjustment unit 202, in which the virtual machines 204 obtain a change value (an increase rate or a decrease rate) for a specific parameter set from the QoS requirements and network statistics, and transfer the obtained change value to the parameter adjustment unit 202. The parameter adjustment unit 202 increases or decreases the values of parameters, which are included in a parameter set used in the network interface 201, based on the change value.

In the multimedia stream transmission apparatus 200, as many virtual machines 204 as required by the client applications 108 can be created.

A virtualization technology applied to the virtual machines refers to separation of resources or service requests in a broad sense. For example, a virtual memory enables computer software to use a capacity greater than that of an installed physical memory by swapping data between the virtual memory and a disk storage device. Similarly, the virtualization technology may be applied to mutually different infrastructure layers, such as a network, a storage unit, server hardware, an operating system, and an application.

A system to which virtualization is not applied has a single operating system for one physical machine. Therefore, since such a system strongly couples software with hardware, a conflict may occur when a plurality of applications are driven in the system, so that hardware resources are inefficiently used. That is, a system to which virtualization is not applied may be regarded as an architecture which is unadaptable and may have a high cost.

In a network environment which contains a plurality of client applications requesting the multimedia stream transmission apparatus of QoS requirements, as shown in FIG. 4, it is difficult that a system to which virtualization is not applied provides an adaptable service satisfying the QoS requirements while efficiently using network resources.

Therefore, the exemplary embodiment proposes creation of as many virtual machines as the client applications or as many virtual machines as the QoS requirements requested by the client applications in the multimedia stream transmission apparatus 200.

Figure 5:
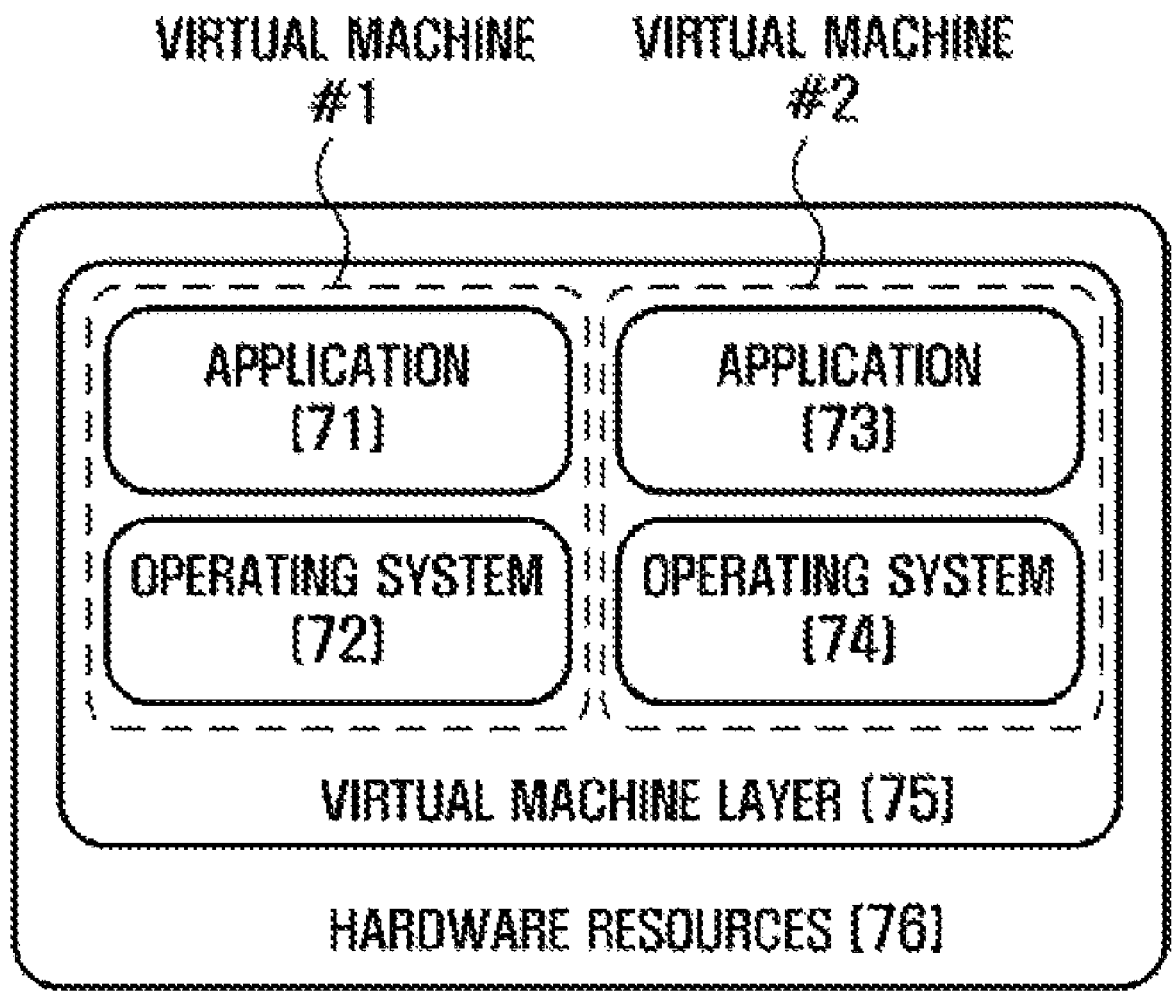
FIG. 5 is a view illustrating the concept of a system to which virtualization is applied according to the exemplary embodiment.

FIG. 5 is a view illustrating the concept of a system to which virtualization is applied. Each of virtual machines (e.g., virtual machine #1 and virtual machine #2) is configured as a combination of a separate application 71 or 73 and a separate operating system 72 or 74, and all virtual machines belong to one virtual machine layer 75. Therefore, the plurality of virtual machines may share hardware resources 76 included in the multimedia stream transmission apparatus 200 with each other.

Each of the virtual machines includes an application and an operating system, which are independent of the hardware, and encapsulates and manages the application and operating system as a unit, for example but not by way of limitation, a single unit.

When a plurality of virtual machines are included in a virtual machine layer 75 of the multimedia stream transmission apparatus 200, as described above, the virtual machines can process the protocol stacks or applications suitable to the requirements of mutually different client applications, respectively.

For example but not by way of limitation, when a bandwidth to be transmittable through a network is dynamically re-allocated to a plurality of virtual machines existing in the multimedia stream transmission apparatus 200, substantially greater bandwidth is allocated to a virtual machine having a relatively higher importance, so that link adaptation for a specific network can be achieved.

Figure 6:
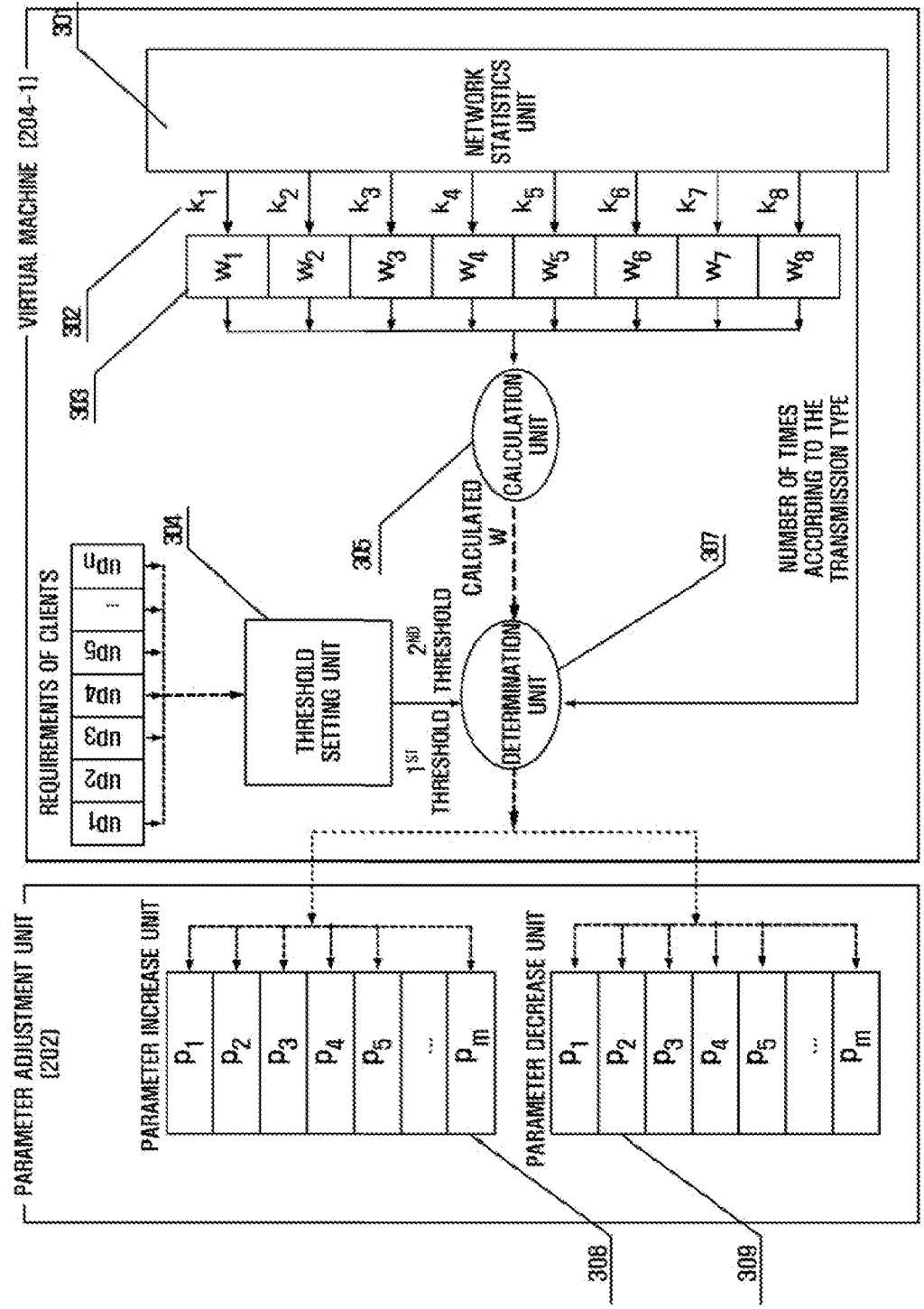
FIG. 6 is a detailed block diagram illustrating the configuration of a virtual machine and a parameter adjustment unit according to an exemplary embodiment of the present invention.

FIG. 6 is a detailed block diagram illustrating the configuration of one virtual machine 204-1 among the virtual machines 204 and the parameter adjustment unit 202 according to an exemplary embodiment of the present invention. The virtual machine 204-1 includes a network statistics unit 301, a threshold setting unit 304, a calculation unit 305, and a determination unit 307. The parameter adjustment unit 202 includes a parameter increase unit 308 and a parameter decrease unit 309.

The network statistics unit 301 surveys statistics for an N number of times of transmission, and provides a weight and the number of times of transmission according to each data rate to the calculation unit 305. In addition, the network statistics unit 301 counts the number of times of transmission according to the transmission type with respect to the N number of times of transmission, and provides the counted values to the determination unit 307. The transmission types may include a successful transmission, a failed transmission, a retransmission, etc.

Then, the calculation unit 305 calculates a transmission factor "W" based on a transmission number "k" 302 and a weight "w" 303. The obtained transmission factor "W" is transferred to the determination unit 307. The term "transmission factor" corresponds to a representative value that represents a tendency of a plurality of transmissions when the transmissions are performed at different data rates.

Figure 7:
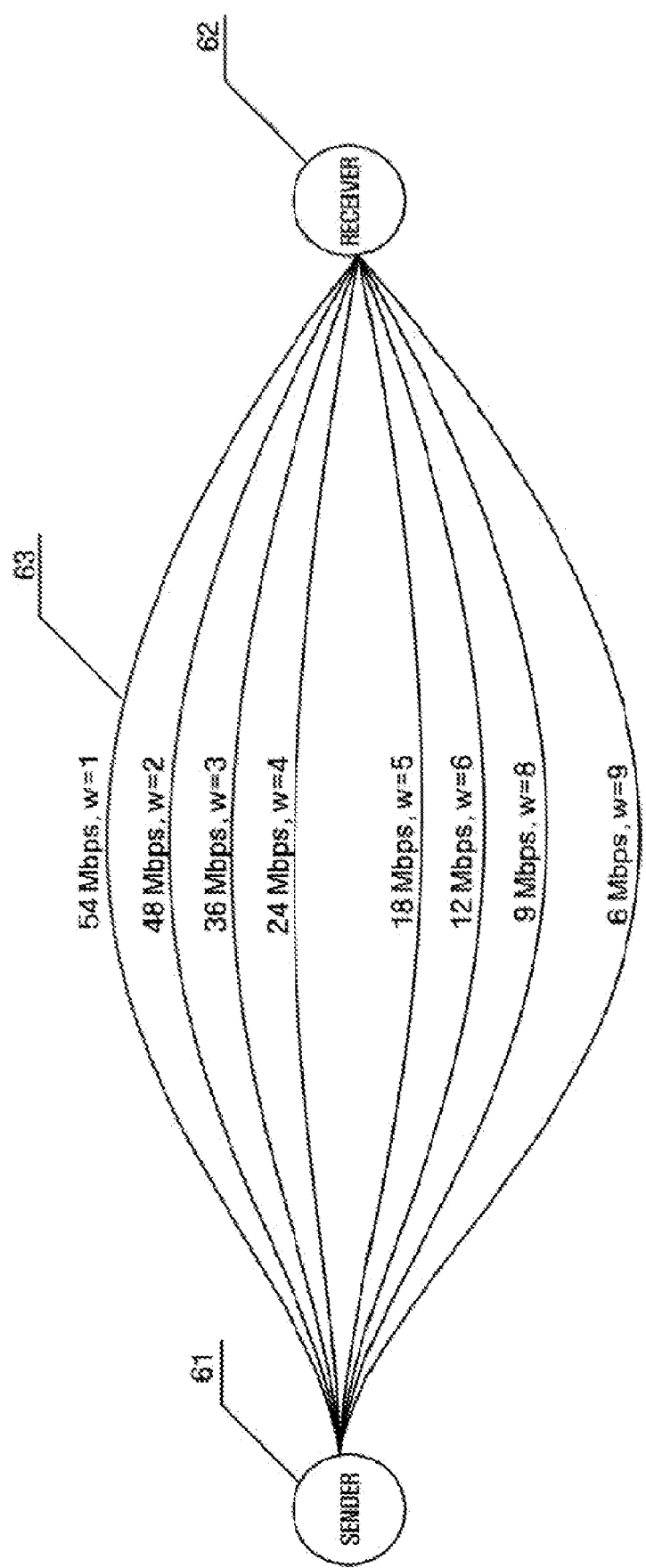
FIG. 7 is a view illustrating an example of calculating a transmission factor according to the exemplary embodiment.

FIG. 7 is a view illustrating an example of calculating a transmission factor, in which a sender 61 can transmit data to a receiver 62 by using a total of eight data rates. In FIG. 7, each path corresponds to one data rate. In this case, the eight data rates may be allocated weights "w" in ascending order or in descending order. FIG. 7 shows a case in which weights are allocated in descending order of the data rates.

The network statistics unit 301 calculates a weighted sum of the number of times of transmission at specific data rates among an N number of times of packet transmission and corresponding weights. The calculated weighted sum corresponds to a transmission factor. When this is generalized, the transmission factor "W" may be defined by Equation 1. In Equation 1, "i" indicates an index representing the type of a data rate, "m" indicates a total number of data rates (i.e., m=8 in the case of FIG. 7), "$k_i$" indicates the number of times of transmission at the data rate of "i," and "$w_i$" indicates a weight for a data rate of "i."

$$W = \sum_{i}^{m} k_i w_i \qquad \text{Equation 1}$$

For example, when the network interface 201 of the multimedia stream transmission apparatus 200 performs seven transmissions at 54 Mbps, three transmissions at 48 Mbps, two transmissions at 36 Mbps, and four transmissions at 24 Mbps, that is, a total of 16 packet transmissions, the transmission factor "W" is calculated as shown in the following Equation 2.

$$W = 7 \times w_1 + 3 \times w_2 + 2 \times w_3 + 4 \times w_4 + 0 \times w_5 + 0 \times w_6 + 0 \times w_7 + 0 \times w_8 = 35 \qquad \text{Equation 2}$$

The determination unit 307 determines a set of parameters to be changed and a change value based on the transmission factor "W" provided from the calculation unit 305 and on the number of times of transmission according to the transmission type, which is provided from the network statistics unit 301, and provides the determined parameter set to the parameter adjustment unit 202.

The threshold setting unit 304 sets at least one threshold for the transmission factor "W" according to requirements "$up_1$ to $up_n$" of the client applications. That is, the threshold may be adjusted to a higher value or a lower value according to the requirements. The following description will be given for a case in which two thresholds (i.e., a first threshold and a second threshold) for the transmission factor "W" have been set. The thresholds for the transmission factor "W" are used for the determination unit 307 to determine a parameter set and a change value.

Figure 8:
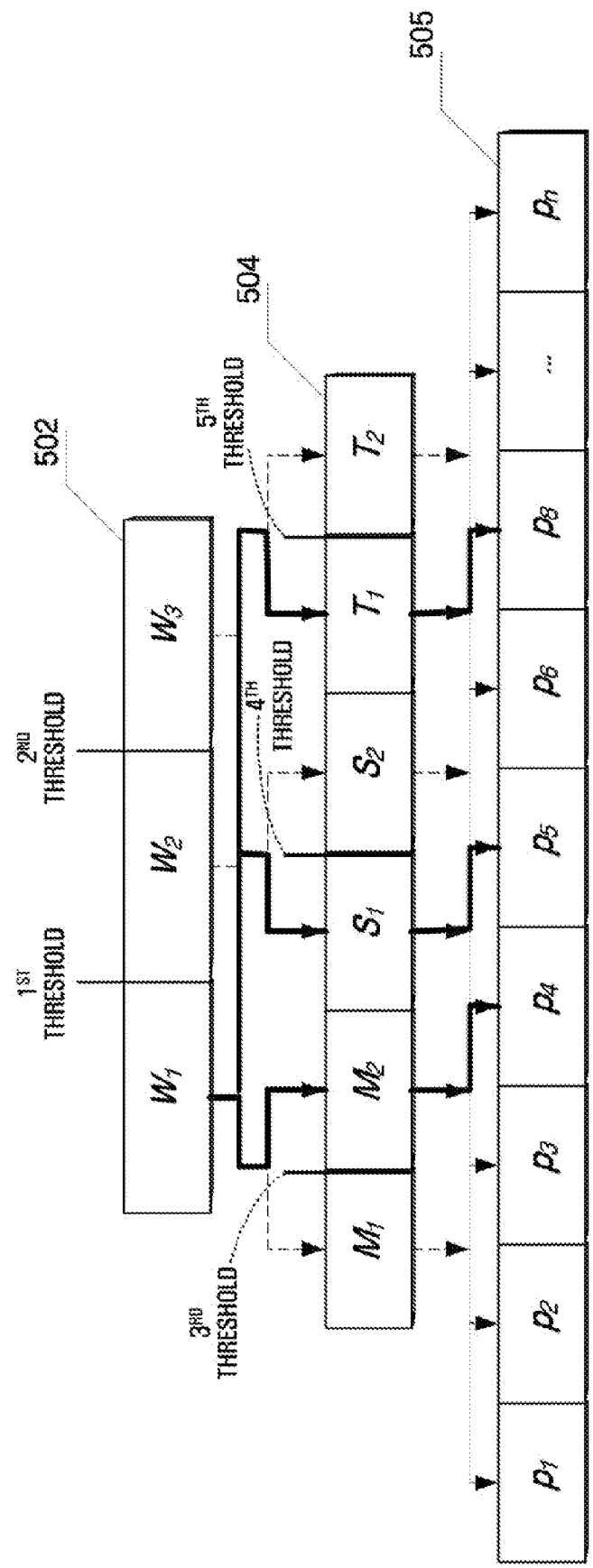
FIG. 8 is a view illustrating the operation of a determination unit according to the exemplary embodiment.

FIG. 8 is a detailed view illustrating the operation of the determination unit 307. Changing parameters based on only the information about whether either the number of times of successful transmission or the number of times of retransmission is high or low is insufficient for changing parameters, and it is necessary to consider the level of a data rate for each transmission. Therefore, the determination unit 307 needs to determine a set of parameters to be changed based on a combination of the value of the transmission factor and the number of times of transmission according to the transmission type. In detail, the determination unit 307 performs determining to which group a transmission factor "W" belongs (operation 502), determining to which group the number of times of transmission according to the transmission type belongs (operation 504), and determining a parameter set according to the determinations (operation 505).

In operation 502, the determination unit 307 divides the entire range, which the transmission factor "W" may have, into a plurality of groups $W_1$, $W_2$ and $W_3$, based on thresholds (i.e., a first threshold and a second threshold) provided from the threshold setting unit 304, and the determination unit 307 determines to which group among the divided groups an actually-calculated transmission factor "W" belongs.

In operation 504, the determination unit 307 divides the entire range, which the number of times of transmission according to the transmission type may have, into a plurality of groups based on thresholds (i.e., a third threshold, a fourth threshold, and a fifth threshold), and the determination unit 307 determines to which group among the divided groups the number of times of transmission according to the transmission type, which has been provided from the network statistics unit 301, belongs. The number of times of transmission according to the transmission type may include the number "M" of times of failed transmission, the number "S" of times of successful transmission, and the number "T" of times of retransmission. When a total number of times of transmission is 14, each of the "M," "S," and "T" may have a value within a range from 1 to 14. Although the above description has been given about the case in which the entire range is divided based on the third threshold, the fourth threshold, and the fifth threshold, the thresholds may be adjusted by the user of the multimedia stream transmission apparatus 200.

In operation 505, the determination unit 307 determines one parameter set (i.e., one of $p_1$ to $p_n$) based on a combination of a group to which the transmission factor "W" belongs and a group to which the number (M, S and T) of times of transmission according to the transmission type belongs. The parameter set is configured by a combination of the entire or a part of various parameters shown in FIG. 3. Therefore, the parameter set may be configured either by one parameter or by a plurality of parameters.

For example, when a transmission factor "W" belongs to group $W_1$, and the number "M" of times of failed transmission belongs to group $M_2$, a parameter set of $p_4$ is selected. Similarly, when a transmission factor "W" belongs to group $W_1$, and the number "S" of times of successful transmission belongs to group $S_1$, a parameter set of $p_5$ is selected. Also, when a transmission factor "W" belongs to group $W_1$, and the number "T" of times of retransmission belongs to group $T_1$, a parameter set of $p_8$ is selected. All or only one of the "M," "S" and "T" may be considered as a transmission type to determine a parameter set, which may change according to the determination of the user of the multimedia stream transmission apparatus 200.

A remaining issue includes how to match a combination of a group to which a transmission factor belongs and a group to which the number of times of transmission according to the transmission type belongs, with a specific parameter set. Such a matching can be experimentally determined. For example, with respect to a case in which a transmission factor belongs to a low group of $W_1$ and the number of times of successful transmission belongs to a high group of $M_2$, a set of parameters exerting the greatest influence thereon can be found. Such a procedure of finding parameters may be regarded as a sensitivity analysis procedure. That is, the procedure is to find at least one parameter exerting the greatest influence on the quality (which can be quantified as a Peek Signal-to-Noise Ratio (PSNR)) of multimedia data to be transmitted when each parameter changes at a rate which may be predetermined. When the experiment of finding parameters to be included in a parameter set, as described above, is performed with respect to all cases, parameter sets for all the cases can be determined.

Referring again to FIG. 6, after determining a parameter set according to the aforementioned method, the determination unit 307 determines a corresponding change value. The change value may be a value large enough to satisfy the requirements of the client application, or may be only an increment predetermined according to each parameter. This is because when such an increment cannot satisfy the requirements of the client application, the increment may be again reflected in the next feedback. When there is a plurality of client applications, a rapid change in a limited channel exerts a negative effect upon different client applications. Therefore, the method of gradually changing the parameters by means of a predetermined increment may be used, as described above.

Based on a parameter set and a corresponding change value, which have been determined by the determination unit 307, the parameter adjustment unit 202 increases the values of parameters belonging to the parameter set through the parameter increase unit 308, or decreases the values of parameters belonging to the parameter set through the parameter decrease unit 309. The parameters increased or decreased as described above are provided to the network interface 201, and then the network interface 201 transmits a multimedia stream based on the parameters from when the next transmission is performed.

The components shown in FIGS. 4 to 6 may be implemented by software, such as a task, a class, a sub-routine, a process, an object, an execution thread and a program, which are performed in a region of a memory, or by hardware such as a Field-Programmable Gate Array (FPGA) and an Application-Specific Integrated Circuit (ASIC). Further, the components may also be realized through a combination of the software and hardware. The components may be included in a computer-readable storage medium, or may also be partially distributed in a plurality of computers.

Also, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

Figure 9:
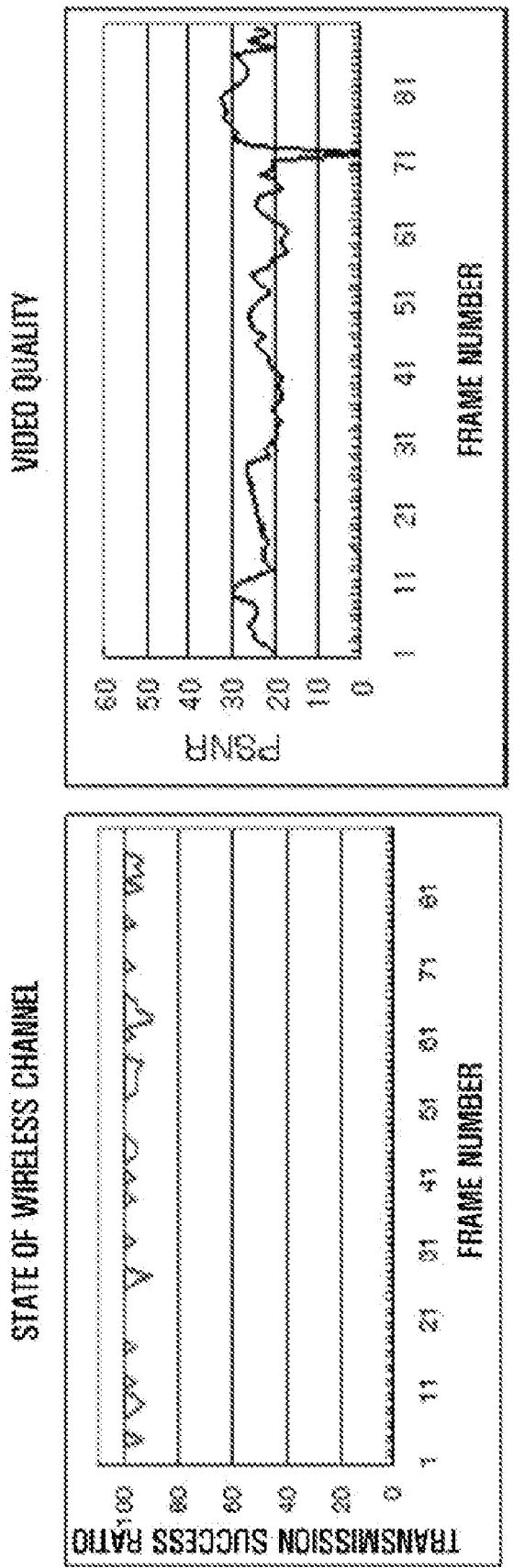
FIG. 9 shows a result obtained when a multimedia stream is transmitted without using the link adaptation according to the exemplary embodiment.
Figure 10:
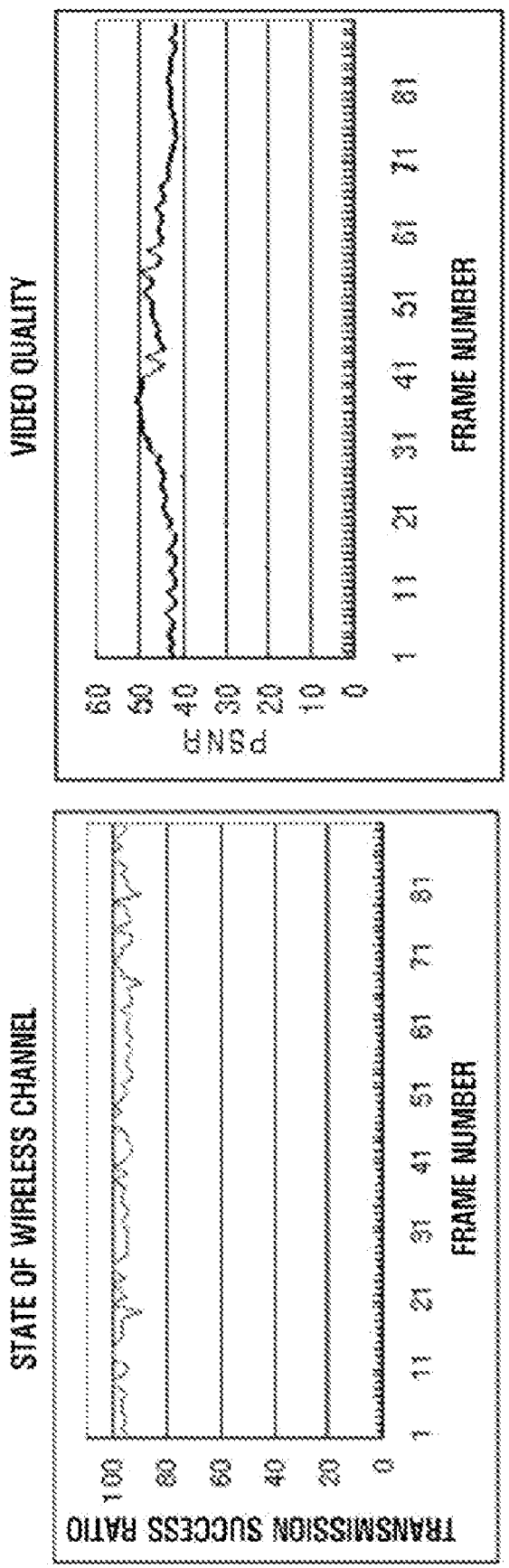
FIG. 10 shows a result obtained when a multimedia stream is transmitted using the link adaptation according to the exemplary embodiment.

FIGS. 9 and 10 are comparative views illustrating the usefulness of the link adaptation. That is, FIG. 9 shows a result obtained when a multimedia stream is transmitted without using the link adaptation, and FIG. 10 shows a result obtained when a multimedia stream is transmitted using the link adaptation. As FIGS. 9 and 10 are compared with each other, there is no difference in a wireless channel state, that is, in terms of a transmission success ratio, as a frame number increases, but FIG. 10 according shows significantly different results in terms of video quality, that is, in terms of the PSNR.

As described above, according to the link adaptation technology, it is possible to guarantee a quality of multimedia data transmitted to a client device through a wireless network.

Although exemplary embodiments have been described for illustrative purposes, the present invention is not limited to the exemplary embodiments, and may be produced in various methods. Those skilled in the art will appreciate that various modifications, additions and substitutions are possible, without departing from the scope and spirit of the invention as disclosed in the accompanying claims. Therefore, it should be appreciated that the embodiments described above are not limitative, but only illustrative.

What is claimed is:

1. An apparatus for variably transmitting a multimedia stream depending on requirements of multiple client applications, the apparatus comprising:
    a plurality of virtual machines corresponding to the multiple client applications, wherein a number of the virtual machines is the same as a number of the multiple client applications, and each of the virtual machines determines a set of parameters and obtains a change value for the set of parameters from network statistics and a requirement of a corresponding client application;
    a parameter adjustment unit which adjusts values of the set of parameters used in a network interface by the change value; and
    the network interface which transmits the multimedia stream based on the adjusted set of parameters,
    wherein each of the virtual machines determines the set of parameters to be changed and the change value for the set of parameters based on a transmission factor and a number of times of transmission of the multimedia stream according to a transmission type, and
    wherein the transmission factor is calculated based on a number of times of transmission of the multimedia stream at each of data rates and a weight for each of the data rates,
    wherein the transmission type comprises at least one of a successful transmission, a failed transmission, and a retransmission.

2. The apparatus of claim 1, wherein each of the virtual machines encapsulates and manages an application and an operating system as a single unit, and shares hardware resources of the apparatus.

3. The apparatus of claim 1, further comprising a streaming unit which generates the multimedia stream from a multimedia source.

4. The apparatus of claim 1, wherein the set of parameters comprise parameters belonging to at least two layers.

5. The apparatus of claim 1, wherein the parameter adjustment unit comprises:
    a parameter increase unit which increases the values of the set of parameters based on the change value; and
    a parameter decrease unit which decreases the values of the set of parameters based on the change value.

6. An apparatus for variably transmitting a multimedia stream depending on requirements of multiple client applications, the apparatus comprising:
    a plurality of virtual machines corresponding to the multiple client applications, each of the virtual machines determining a set of parameters and obtaining a change value for the set of parameters from network statistics and a requirement of a corresponding client application;
    a parameter adjustment unit which adjusts values of the set of parameters used in a network interface by the change value; and
    the network interface which transmits the multimedia stream based on the adjusted set of parameters,
    wherein the virtual machine comprises:
    a network statistics unit which surveys statistics for a number of times of transmission of the multimedia stream, providing a number of times of transmission of the multimedia stream at each of data rates and a weight for each of the data rates, and providing a number of times of transmission of the multimedia stream according to a transmission type;
    a calculation unit which calculates a transmission factor representing a tendency of a data rate based on the number of times of transmission of the multimedia stream at the each of data rates and the weight for the each of the data rates; and
    a determination unit which determines the set of parameters to be changed and the change value for the set of parameters based on the transmission factor and the number of times of transmission of the multimedia stream according to the transmission type,
    wherein the transmission type comprises at least one of a successful transmission, a failed transmission, and a retransmission.

7. The apparatus of claim 6, wherein the calculation unit calculates the transmission factor by summing the number of times of transmission of the multimedia stream at the each of data rates multiplied by the weight for the each of the data rates.

8. The apparatus of claim 7, wherein the value of the transmission factor or the number of times of transmission according to the transmission type is classified based on a group to which the value of the transmission factor or the number of times of transmission according to the transmission type belongs, from among groups divided based on a threshold.

9. The apparatus of claim 8, wherein two thresholds classify the value of the transmission factor, in which the two thresholds are set based on the requirement of the client application.

10. A method for variably transmitting a multimedia stream depending on requirements of multiple client applications, the method comprising:
    creating, by a hardware processor, a number of virtual machines corresponding to a number of the client applications, wherein the number of the virtual machines is the same as the number of the multiple client applications;
    determining, by a hardware processor, a set of parameters and a change value for the set of parameters, from network statistics and a requirement of a corresponding client application by using each of the virtual machines;
    adjusting, by a hardware processor, values of the set of parameters used in a network interface by the change value; and
    transmitting, by a hardware processor, the multimedia stream based on the adjusted set of parameters,
    wherein each of the virtual machines determines the set of parameters to be changed and the change value for the set of parameters based on a transmission factor and a number of times of transmission of the multimedia stream according to a transmission type, and wherein the transmission factor is calculated based on a number of times of transmission of the multimedia stream at each of data rates and a weight for the each of the data rates, wherein the transmission type comprises at least one of a successful transmission, a failed transmission, and a retransmission.

11. The method of claim 10, wherein each of the virtual machines encapsulates and manages an application and an operating system as a single unit, and shares hardware resources of a multimedia stream transmission apparatus.

12. The method of claim 10, which further comprises generating the multimedia stream from a multimedia source.

13. The method of claim 10, wherein the set of parameters comprise parameters belonging to at least two layers.

14. The method of claim 10, wherein
the transmission factor is calculated by summing the number of transmission of the multimedia stream at the each of data rates multiplied by the weight for the each of the data rates.

15. The method of claim 10, wherein the adjusting the values of the set of parameters comprises: increasing the values of the set of parameters based on the change value; and
decreasing the values of the set of parameters based on the change value.

16. A non-transitory computer readable medium configured to store instructions for variably transmitting a multimedia stream depending on requirements of multiple client applications, the instructions comprising:

creating a number of virtual machines corresponding to a number of the client applications, wherein the number of the virtual machines is the same as the number of the multiple client applications;

determining a set of parameters and a change value for the set of parameters, from network statistics and a requirement of a corresponding client application by using each of the virtual machines;

adjusting values of the set of parameters used in a network interface by the change value; and transmitting the multimedia stream based on the adjusted set of parameters, wherein each of the virtual machines determines the set of parameters to be changed and the change value for the set of parameters based on a transmission factor and a number of times of transmission of the multimedia stream according to a transmission type, and wherein the transmission factor is calculated based on a number of times of transmission of the multimedia stream at each of data rates and a weight according to each of the data rates, wherein the transmission type comprises at least one of a successful transmission, a failed transmission, and a retransmission.

* * * * *